3,353,910
ALUMINA PARTICLES AND METHOD
OF PREPARATION
Edward B. Cornelius, Swarthmore, Lee A. Cosgrove, West Chester, and George Alexander Mills, Swarthmore, Pa., assignors to Air Products and Chemicals, Inc., Philadelphia, Pa., a corporation of Delaware
No Drawing. Filed Jan. 17, 1963, Ser. No. 252,041
5 Claims. (Cl. 23—141)

This invention relates to the treatment of alumina hydrates, to produce hard, strong, spheroidal particles of alumina utilizable as contact masses for catalyzing reactions or effecting other treatment of materials in the chemical processing or petroleum refining industries, or utilizable as supports or carriers for catalytic materials which may be incorporated or applied to the particles during the preparation stage, or after conditioning treatment of the particles to improve their strength, hardness, appearance, etc. Alumina hydrate is the term most widely used to include gibbsite, (alpha-alumina trihydrate); bayerite, (beta-alumina trihydrate); nordstrandite; boehmite and diaspore (called alpha-alumina monohydrate and beta-alumina monohydrate respectively). It has been conclusively shown that these five materials are not hydrates of alumina but are rather hydroxides, the first three being trihydroxides of aluminum and the latter two being hydroxides of aluminum.

A present commercial method of forming alumina particles of the general type to which the invention relates is described in U.S. Patent 2,809,170 of Cornelius, Milliken and Mills. The patent discloses a method of preparing attrition-resistant alumina particles which involves the impregnation of an alumina trihydrate powder with an aqueous solution containing nitric acid, followed by pressuring, mixing, and extrusive pelleting of the mix to form green pellets of generally cylindrical shape having a minimum dimension within the range of about 2–13 mm. Subsequent conditioning treatment converts the green pellets to alumina and imparts to the finished article the desired characteristics of strength, hardness, etc. This method of manufacture produces a relatively high density particle or pellet, partly as a result of the pressuring required during the pelleting operation.

It has been found, however, that in certain commercial applications, such as in the treatment of gaseous materials, there may be a need for a more open structure, that is, lower density, in the finished pellet in order to overcome diffusion limitations with respect to the gaseous reactants while in use, and for other reasons; also, a need for a more spherical or spheroidal configuration in the finished pellet to minimize catalyst losses through attrition. The requirement as to shape may be satisfied to some degree by subsequent rolling treatment of the extruded cylindrical pellets to round off the sharp edges and generally reshape the same to more spherical form. While some variation in density of the finished pellets may be achieved by control of the liquid content of the extrudable mix, thereby controlling the pressure requirements for extruding, there are practical limitations on the degree to which the shape or density of the pellet may be adjusted through these expedients.

Pelletizing processes and apparatus for production of nodular or spheroidal agglomerates by admixture of wettable powders with suitable liquids in a rolling or tumbling operation are well known. Among the better known commercial machines for effecting such agglomerative spheroidizing operations are the Dravo Pelletizing Disc, in which the powder/liquid mixture is rolled on a disc or pan rotating on an inclined axis; the Patterson-Kelley Twin Shell Liquid-Solids Blender, in which the materials are blended by a rapidly rotating intensifier bar within a slower rotating housing or container which agglomerates the mixture by mass tumbling action; the Kennedy-Steffensen Cone Pelletizer, in which the materials are rolled in a truncated conical housing rotating on an inclined axis; and pelletizing drums of known design.

Among the objects of the present invention is the production of low-density alumina pellets of acceptable hardness and of generally spheroidal shape, that is, having well-rounded bounding surfaces, useful as a contact mass or as a support or component for catalyst, said pellets being of relatively high porosity (having a pore volume in excess of 0.5 cc./g. as determined by mercury penetratration) and having at least 40% of the pore volume made up of macropores (of diameter in excess of 350 A. (0.035 micron) and with average pore size lying predominantly in the 5–10 micron range). In contrast thereto, typical alumina supports in present commercial use for platinum reforming catalysts have relatively little macroporosity, the major portion (65% or more) of their pore volume being furnished by pores in the 17.5–350 A. (0.00175– 0.035 micron) range, with the average pore size predominantly below 0.035 micron.

Stated otherwise, the pellets of the invention have a pore volume of 0.2–0.3 cc./g. made up of pores lying in the 5–100 micron diameter range, as contrasted with typical commercial platinum-alumina catalyst pellets which have less than 0.01 cc./g. of pore volume contributed by pores in the same diameter range.

A further object of the invention is the production of alumina pellets of the indicated open and large pore structure having a relatively high crushing strength. The preferred pellets produced in accordance with the invention show a single pellet, plate-to-plate crushing strength of 5 lbs. or more for pellets of through 8 on 10 screen size (U.S. Standard).

A further object achieved in accordance with a preferred embodiment of the invention is the production of low-density, spheroidal, alumina pellets by agglomeration, without mechanically applied pressure, under conditions such that a major portion of the obtained pellets, prior to screening, lies within a narrow and controlled size range. Other objects and advantages of the invention will be appreciated from the more detailed description which follows.

In accordance with the invention, spheroidal pellets of alumina having desired low density and high porosity are formed by subjecting hydrated alumina power wetted with a controlled amount of aqueous mineral acid rolling or tumbling action in conventional spheroidizing apparatus, such as a rotating pan or disc. In general, the desired spheroidal green pellets are obtained when the liquid/solids mixture subjected to the rolling or tumbling action is one having a greater proportion of liquid to solids than is generally used in forming an extrusion mix, but short of that resulting in a flowable slurry.

The powder mix from which the pellets are to be formed may comprise a pure alumina hydrate, or a combination of several alumina hydrates, and may possibly contain, in addition to these hydrates, varying amounts of other powdered materials for the purpose of imparting special characteristics to the raw mix or to the finished product, or for the purpose of facilitating or improving any of the procedural steps in making or treating the particles or pellets.

While nitric acid is considered to be a preferred binder for most applications, the invention does not exclude the use of other volatile mineral acid binders or other special liquids, with or without the addition of other solid materials to impart special properties. In using aqueous nitric acid as the liquid agglomerating agent, the reaction with alumina hydrate produces aluminum nitrate, which serves as the inter-particle binder imparting coherent strength to the green pellets. On subsequent dehydration and decomposition of the formed nitrate salt, the reconstituted alumina remains as the permanent binder in the finished pellet.

In practice of the invention, an alumina hydrate, such as bayerite, gibbsite or boehmite, etc., or combinations thereof, in powder form is admixed with a controlled amount of an aqueous mineral acid solution of about 15–60% concentration to provide a plastic mass of alumina hydrate characterized by an appreciable particle-to-particle coherence such that, while the mass will readily crumble or break up into smaller coherent masses, it will not pile at an angle of repose.

The quantity of aqueous acid employed will vary to some extent with the specific type and composition of the hydrated alumina powder, including the particle size and particle size distribution. In general, however, the total quantity of liquid used to obtain a mix of desired plastic consistency will be significantly higher than that needed in making up a mix for pressure extrusion, but short of that resulting in a flowable slurry. In the case of aqueous nitric acid and a commercially available aluminum trihydroxide powder (bayerite), plastic masses forming spheroidal agglomerates by rolling techniques were obtained when using about 0.25 liter of liquid per kilo of powder. With other mineral acids, such as hydrochloric or sulfuric, the quantity of acid and of total liquid needed to obtain pellets of optimum properties may vary.

In a typical operation in accordance with one embodiment of the invention, the alumina hydrate powder is continuously fed onto the rotating pan of a 39-inch Dravo Pelletizing Disc and simultaneously sprayed with aqueous nitric acid which is gradually worked into the powder to form, by repeated rolling and tumbling action, soft spheroidal agglomerates or green pellets which are continuously discharged from the disc. The obtained green pellets are aged under such conditions and for such time as to permit completion of the chemical reaction between the acid and the alumina, and are then dried. The dried pellets are then exposed to elevated temperature sufficient to dehydrate (or, more accurately, dehydroxylate) the same and, where applicable, to decompose salts formed by the acid reaction, thereby reconstituting alumina which acts as a firm binder between the particles of the pelleted agglomerate.

In practice of the foregoing method, it has been found that the conditions prevailing during initial drying of the green pellets have a significant effect upon the crushing strength of the pellets. Thus, to obtain dried and dehydrated pellets having a degree of hardness or strength desirable for practical handling in subsequent treatment or use, for example, a single pellet, plate-to-plate crushing strength in excess of one pound, slow drying for eight hours or longer under conditions of high humidity is required when using relatively dilute nitric acid (about 20–25% $HNO_3$). On the other hand, when more concentrated nitric acid (about 40% $HNO_3$) is employed in the same proportion of liquid to solids dried pellets of equal or better hardness are obtained by drying at high humidity for only about two hours. Extension of the drying time in this instance has little additional effect upon hardness, as determined by crushing strength.

In the above-described embodiment of the invention the green spheroidal pellets were formed by spraying the aqueous acid, in suitable concentration and amount, into an inclined rotating pan to which the alumina hydrate powder was continuously fed. In this manner 3.1 mm. average diameter spheroidal pellets having, after dehydration, a single pellet, plate-to-plate crushing strength of up to about three pounds, or even greater, can be obtained. More or less spheroidal pellets of such crushing strength and desired low density and high porosity are similarly obtained by effecting the admixture of alumina hydrate powder and aqueous acid in the described proportions in other types of liquid/solids blenders which subject the wetted mass to rolling or tumbling action to effect agglomerative spheroidizing. Typical of such blenders are the well-known Patterson-Kelley blender, which utilizes a rapidly rotating intensifier bar within a more slowly rotating housing, and the Kennedy-Steffensen Cone Pelletizer in which the mixture is rolled in a truncated conical housing rotating on an inclined axis.

As set forth in copending application Ser. No. 252,040, filed concurrently herewith, the crushing strength of pellets obtained by the above-described and other methods of agglomerative spheroidizing can be considerably enhanced by subjecting the green spheroidal pellets, prior to their being dried and while still containing free liquid, to a post-rolling or tumbling operation for a suitable short period of time, followed by drying and dehydration. By utilizing this post-rolling technique, dehydrated 3.1 mm. average diameter alumina pellets having a single pellet, plate - to - plate crushing strength of about 5–8 pounds and a packed bulk density of about $0.62 \pm 0.05$ kg./l. are obtained.

It has been further found, in accordance with a preferred embodiment of the invention, that low-density spheroidal agglomerates of alumina having high porosity and equal or better hardness can be obtained without resort to the described post-rolling operation. In practice of this preferred embodiment, the aqueous acid and the aluminum trihydroxide powder, in suitable acid concentration and proportion of liquid to solids, are initially admixed and worked to form a wetted cohesive mass. This initial mixing of liquid and powder can be carried out in any suitable liquid/solids blender permitting relatively uniform incorporation and distribution of the liquid through the solids mass. A convenient apparatus for effecting the initial admixture is the well-known edge runner or muller mixer type (such as the Lancaster Mixer). Good admixing can usually be effected in about 25–30 minutes, the total acid being added during the initial one-third to one-half of the mixing period, and the remaining portion of such period being devoted to working up the wetted mass.

The acid-wetted mixture is then subjected to aging under conditions involving relatively little change in moisture content to complete the reaction between the acid and the alumina hydrate. The reaction being exothermic, there is a consequent temperature rise. During the aging period, or subsequent thereto, the mixture is cooled to about ambient or room temperature, after which the wet powder or cake is fluffed or broken up into a loose mass of particles or small aggregates, as by screening, and is fed to any type of rolling or tumbling apparatus effective in agglomerating the wet particles or aggregates of the same into generally spherical or spheroidal masses. In this manner, pellets of fairly uniform size-range are obtained. These pellets, after drying and dehydration, have a single pellet, plate-to-plate crushing strength in excess of 5 pounds, for a 2.2 mm. average diameter particle, without post-rolling. If desired, however, the green pellets, prior to drying, may be subjected to the hereinbefore described post-rolling operation. While, in this instance, there is relatively little enhancement in hardness gained by the post-rolling treatment, the finished pellets may be smoother and more polished in appearance.

In a typical operation in accordance with the preferred embodiment, the alumina trihydrate powder, preferably one composed predominantly of bayerite, and the aqueous mineral acid are pre-mixed in a liquid/solids blender, such as the Lancaster or Patterson-Kelley type, and the mixture is mechanically worked for a period of time determined by the particular type of equipment used. The total liquid is introduced during the initial one-third to one-half of the working period. During such period, the chemical reaction between the alumina hydrate and the mineral acid is initiated, with resultant evolution of heat which raises the temperature of the mix.

The partially-reacted, wet mix is removed from the liquid/solids blender and is permitted to stand at least for a period, such as about 2-4 hours, sufficient to complete the chemical reaction which forms aluminum nitrate as a pasty interparticle binder. During such period, the mix is stored in sealed containers, in order to minimize change in moisture content. Preferably, however, storage is continued for a much longer period, such as overnight, until the mix returns to ambient or room temperature. In view of the substantially higher liquid/solids ratio employed, as compared to that required for pelletizing by standard extrusion techniques, an appreciably greater portion of the alumina hydrate is reacted. Thus, whereas about 3% of the alumina hydrate is reacted in the extrusion technique, the higher liquid/solids ratio employed by the blending technique of this invention causes about 4-5% of the alumina hydrate to be reacted.

The nature of the chemical reaction occurring between the admixed mineral acid and alumina hydrate will depend upon the particular alumina hydrate and mineral acid employed. In a preferred operation employing the beta trihydrate as the powder ingredient, the most suitable mineral acid was found to be nitric acid. In the preferred application of the invention the chemical reaction produces a thermally decomposable aluminum salt which by more or less standard heat treating techniques is readily changed to alumina.

Following the reaction and cooling period, the wet mix is fluffed or broken up, as by screening, to obtain small coherent particles or aggregates of fairly uniform size. Screen openings of about .03–.07 inch are satisfactory. While smaller screen sizes may be employed, there is little practical advantage gained, and substantially greater pressures are required to force the material through the screen. The small coherent particles or aggregates are fed directly to a pelletizing or nodulating machine, such as a Dravo Pelletizer, which employs a large shallow rotating pan or disc having its axis inclined to the vertical. Preferably, the small particles are deposited in a well-distributed pattern over a broad area of the pan in order to prevent the particles from being reaggregated before reaching and being rolled upon the surface of the pan. A suitable arrangement for achieving such distribution is to first deposit the screened particles upon a wide, sloping delivery chute which directs the particles onto the surface of the rotating pan, the delivery chute being smooth-surfaced and set at an angle sufficient to preclude any hold-up of small particles or aggregates upon its surface, such as about 60° to the horizontal.

By rolling action in the pelletizer disc the small particles or aggregates are gradually agglomerated into rounded pellets of generally spherical or spheroidal shape. Long-continued rolling, however, does not build up or agglomerate the aggregates into increasingly larger pellets. The substantial major portion of the formed pellets will fall within a fairly narrow size range. The size of the initial screened particles or aggregates which are deposited as discrete masses upon the surface of the delivery chute must be considerably smaller than the desired product, whose size is determined by the liquid/solids ratio and the mechanical work received in the mixing step. It is a particular object of the invention to produce spherical alumina pellets or particles which fall predominantly, such as about 85%, within a size range of about 1.2–2.8 mm. and have a packed bulk density of about .66–.72 kg./l. after standard drying and calcination treatments.

The formed spheroidal pellets may be partially dried under conditions of controlled humidity and low temperature in the range of about 150–200° F. for a short period of about several hours, and are then finish dried at about 250° F. with through circulation of air. In some instances, the controlled-humidity, low-temperature portion of the drying procedure may be eliminated, without detriment.

The dried pellets are then subjected to a standard procedure in which substantially all of the aluminum hydroxides and aluminum nitrate are decomposed to alumina. In this standard procedure the furnace temperature is held at 600° F. with a low air rate until the pellets reach a temperature of 575° F., by which time a substantial major portion of the decomposition reaction is completed. The furnace temperature is then increased to 900° F., and the pellets are brought up to this temperature. The latter temperature is held, under increased air rate, for about 2 hours, at which time the decomposition to alumina is substantially complete. A typical preferred operation includes the use of air having a dew point of —40° F. and a heating rate not exceeding about 2½–3° F./minute. Upon cooling, the pellets are ready for use as a contact material, or for further treatment to incorporate special catalytic materials therein by known impregnation techniques.

To demonstrate the practicability of the invention and to investigate the factors determining ultimate hardness and crushing strength of the pellets, the following experiments were performed.

*Experiment I*

Carboy nitric acid (42° Baumé) was diluted with an equal volume of distilled water to provide an aqueous nitric acid solution of about 1.25 specific gravity (at 20° C.) containing about 40% by volume $HNO_3$.

The diluted acid solution was sprayed into the rotating pan of a 39-inch Dravo Pelletizing Disc, onto which there was simultaneously deposited a quantity of powdered beta alumina trihydrate. The powder was added to the disc at the rate of 720 g./min., and the diluted acid at 284 ml./min.

Spheroidal agglomerates (green pellets) discharging from the lower edge of the sloping pan were collected in plastic bags, sealed, and permitted to stand at room temperature for a period of several days, a time considerably longer than necessary to complete the chemical reaction between the acid and the trihydrate to form aluminum nitrate.

The aged pellets were then placed in a lightly-covered container to maintain high-humidity conditions, and the container was placed in an oven maintained at 200° F. At time-intervals of 2, 4, 8, 16, 32 and 64 hours, samples of the pellets were withdrawn from the container in the oven and were finish-dried for 2 hours on a screen tray by through circulation of hot air at 250° F. Each sample of withdrawn pellets was then heated batchwise in a container to convert the aluminum nitrate and the trihydroxide to alumina by circulation of —40° F. dew point air at 600° F. and at a rate of 3/10 vol. air/min./vol. of container, until the pellets reached a temperature of 575° F. The air temperature was then increased to 900° F. and the air circulation was stepped up to 1 vol. air/min./vol. of container. This treatment was continued for 2 hours after the pellets reached a temperature of 900° F.

Samples of the treated pellets, screened to a size of through 6-on 7 mesh (U.S. Standard) were tested for bulk density and crushing strength. Each of the samples had a bulk density of about 0.56 to 0.58 kg./l. and showed a single pellet, plate-to-plate crushing strength in the range of about 2.3 to 3.1 pounds. There was no significant change in such crushing strength attributable to any increase in the high-humidity drying time beyond two hours.

*Experiment II*

Another batch of green pellets was prepared in the same manner as in the preceding experiment, but using one volume of 42° Baumé nitric acid diluted with three volumes of distilled water to provide an aqueous nitric acid solution of about 1.125 specific gravity (at 20° C.) containing about 21.4% by volume $HNO_3$.

As before, different samples of the pellets, after room temperature aging for several days, were subjected to slow, high-humidity drying at 200° F. for various periods of time. It was found that at least about 8 hours of high-humidity, slow drying was required before the pellets obtained a degree of hardness corresponding to a single pellet, plate-to-plate crushing strength of more than one pound, the minimum strength considered necessary for practical handling of the pellets.

*Experiment III*

The procedure of Experiment II was repeated, except that the green pellets discharged from the disc were held at room temperature for only two hours, before being subjected to high-humidity, slow drying at 200° F. It was again found that the pellets which were slow dried for four hours or less, and then dried and dehydrated, had a single pellet, plate-to-plate crushing strength of less than one pound, whereas the pellets similarly prepared and treated, but slow-dried for eight hours or more, showed a crushing strength of about 1.5 to 2.0 pounds.

As shown in greater detail in the aforesaid companion application Ser. No. 252,040, pellets having a single pellet crushing strength in excess of 5 pounds and up to about 8 pounds can be obtained by the method of the preceding experiments if the green pellets are subjected to a post-rolling treatment prior to drying. The bulk density of the finished pellets thus obtained lay in the range of 0.58 to 0.67 (about 0.62±.05) kg./l.

All the pellets produced by the methods described in Experiments I to III showed a high porosity, made up largely of macropores, at least 60% of the pore volume being contributed by pores lying in the 0.035 to 100 micron diameter range.

*Experiment IV*

In accordance with the preferred embodiment of the invention, hard, macroporous, spheroidal agglomerates of alumina were prepared by a pre-mixing operation as follows:

In a Lancaster mixer (model SKG-12) 17.5 kilograms of bayerite powder were mulled for 30 minutes with 5.43 kilograms of diluted aqueous Carboy nitric acid (42° Baumé) having a specific gravity of about 1.24 (at 60° F.) and containing about 40.5% $HNO_3$, the acid being added during the first 6 to 8 minutes of the total mulling time.

After completion of the mulling operation, the mixture was held at ambient temperature in a closed container, to prevent moisture change, until the reaction between the acid and the aluminum trihydroxide was completed, and until the mixture, which developed an exothermic temperature rise during the reaction period, returned to ambient temperature. The chemical reaction was completed in about 2-4 hours, but the mixture was permitted to further stand overnight, in order to effect the desired cooling.

The aged and wet mixture was then passed through a Stokes Oscillating Granulator (model 43A) fitted with a 14 x 14 mesh stainless steel screen, and the screened, deaggregated material was dropped in its finely-divided, particulate or slightly-aggregated state onto a rotating 39-inch Dravo Pelletizing Disc at feed rates which varied between about 100 to 400 lbs./hr. The delivery chute from the Stokes Granulator to the Dravo Pelletizer was set at an angle of about 60° to the horizontal, in order to assure free flow and particulate distribution of the deaggregated wet mix onto the surface of the rotating disc.

The pellets as received from the Dravo Pelletizer were ready for drying, although the pellets could be further aged, if so desired, by storage for several days, or even weeks. In the drying step, the pellets were contacted on a screen tray with hot air at about 250° F., with through circulation of the air for a period of about 2 hours, and without the introduction of steam.

After such drying, the pellets were calcined by the standard procedure employed in Experiment I, in which the pellets were contacted in a container by −40° F. dew point air at 600° F. and at a rate of 3/10 vol. air/min./vol. of container until the temperature of the pellets reached 575° F. The air temperature was then increased to 900° F. and the air circulation was stepped up to 1 vol. air/min./vol. of container. This treatment was continued for 2 hours after the pellets reached a temperature of 900° F., by which time the change to alumina was substantially complete to form the desired hard, porous, spheroidal pellets.

The obtained spheroidal calcined pellets are not substantially different, in regard to size, from the pellets in the dried-only condition. In the latter condition the pellets were found to have a packed bulk density of 0.66-0.72 kg./l., with about 87% of the pellets falling within the size range of 1.6±0.8 mm. diameter.

A screened cut (through 8-on-10, U.S. Standard) of 2.00-2.38 mm. pellets was found to have a single pellet, plate-to-plate crushing strength of 5.5-6.3 pounds. Closely screened cuts of the pellets, when subjected to a bulk crushing resistance test at 1000 lbs./sq. in., showed a retention of about 80% of the pellets on the next smaller size (12 mesh) screen, with only 10% being broken into particles of less than one millimeter size.

Employing the pre-mix technique of the invention, as compared to direct mixing of acid and powder on the pelletizer disc as set forth in the aforementioned companion application Ser. No. 252,040, post-rolling of the green pellets is not essential to improvement in hardness, although a short rolling treatment following the discharge of the green pellets from the pelletizer contributes materially to improved appearance and roundness of the pellets, even though there may be no significant improvement in physical strength.

Finished platinum-alumina catalyst pellets from Experiments III and IV were subjected to a mercury penetration test to determine the pore volume and pore size distribution, with the results tabulated below.

TABLE 1

| | Total pore vol., cc./g. | Differential Pore Volume (cc./g.) Between Pore Diameters (microns) of— | | | | | |
|---|---|---|---|---|---|---|---|
| | | 0.035-0.1 | 0.1-1.0 | 1-5 | 5-10 | 10-20 | 20-100 |
| III | 0.68 | 0.014 | 0.053 | 0.090 | 0.096 | 0.137 | 0.023 |
| IV | 0.55 | 0.005 | 0.033 | 0.040 | 0.135 | 0.039 | 0.029 |

Samples of these platinum-alumina catalysts derived from pellets obtained from Experiments III and IV were then compared with commercial platinum-alumina catalysts, arbitrarily designated A, B, C and D, with the results tabulated below:

TABLE 2

| | Total pore vol., cc./g. | Pore Volume (Percent) Between Pore diameter (microns) of— | | Pore Vol. (cc./g.) in range of 5–100μ |
|---|---|---|---|---|
| | | 0.035–100 | 0.00175–0.035 | |
| III | 0.68 | 60 | 40 | 0.256 |
| IV | 0.55 | 51 | ------ | 0.203 |
| A | 0.40 | 35 | 65 | 0.009 |
| B | 0.47 | 30 | 70 | 0.009 |
| C | 0.41 | 27 | 73 | 0.009 |
| D | 0.86 | 5 | 95 | 0.008 |

Pellets of alumina made in accordance with the technique disclosed in connection with Experiment IV were impregnated with platinum and with chromia by standard impregnation procedures and were tested as follows.

Comparison tests were made between a 0.5 wt. percent platinum-alumina catalyst derived from the experimental alumina pellets made in accordance with the technique of Experiment IV and a platinum-alumina catalyst of extruded type presently in commercial use. The experimental and commercial catalysts were tested for the production of 96 F–1 clear octane from an East Texas naphtha at 500 p.s.i.g. and at a 3 volume space rate. It was found that, whereas the commercial type catalyst required a temperature of 925° F., the experimental catalyst produced the same conversion at a lower temperature of 914° F. At the same higher temperature (925° F.), the experimental catalyst required a space rate of 5, as against 3 for the commercial type catalyst. Product distribution was identical for the two types.

Comparison tests were made also between a 20 wt. percent chromia-alumina catalyst derived from the experimental alumina pellets made in accordance with the technique of Experiment IV and a plant produced commercial grade of chromia-alumina catalyst pellets made by the extrusion technique.

The catalysts were tested in the dehydrogenation of n-butane (98.7% pure) at 120 mm. Hg absolute pressure and at a 1 volume space rate. Tests were performed at reactor temperatures of 1000, 1050 and 1100° F. The tests on the experimental type catalyst were made on samples in five different size ranges, from through 5-on 6 to through 10-on 12 mesh sizes (U.S. Standard).

The experimental catalyst pellets had an approximate packed bulk density of 0.85 kg./l. and a single pellet, plate-to-plate crushing strength in the range of about 1.4–9.3 lbs., increasing with pellet size, as compared with a bulk density of about 1.04 kg./l. and a crushing strength of about 26.8 lbs. for the extruded-type, commercial catalyst.

The results of the foregoing tests indicated no apparent effect of reduction of particle size on the activity and selectivity of the experimental catalysts. This phenomenon is believed due to the high degree of porosity in the 1–20 micron pore diameter range. The experimental catalyst was more active and produced more useable products (butenes and butadiene) at a given temperature. Furthermore, the experimental catalyst was more selective than the commercial type, producing less coke and $C_1$–$C_3$ gas. While the selectivity for butadiene alone was practically the same for the two types of catalyst, the total selectivity was greater for the experimental catalyst, due to the increased butenes selectivity.

The demonstrated superiority of the catalysts made in accordance with the invention over present commercial types of platinum-alumina and chromia-alumina catalysts is apparently entirely attributable to the low density or open pore structure of the pellets produced by the herein disclosed agglomerative spheroidizing techniques.

Since the formed pellets possess not only the desirable open pore structure which minimizes much of the diffusion problem generally encountered, but also an acceptable degree of crushing strength for normal handling, the method of the invention produces an improved alumina pellet of considerable utility as a carrier or support in the aforementioned and other chemical treating processes.

By the method of the invention there is produced a pellet having not only desirable characteristics with respect to porosity or open pore structure, hardness or strength, activity, and selectivity, but also improved general appearance with respect to roundness and smoothness. Other things being equal, the latter characteristics have been found to be significant factors in respect to commercial acceptability.

For further general improvement in appearance, the pellets formed on the Dravo Pelletizing Disc may be discharged into a smooth-surface rolling drum rotating on an axis slightly inclined to the horizontal, so that the pellets have about a 30 second hold-up time in the drum. This is not to be confused with the so-called post-rolling or mass tumbling treatment disclosed in companion application Ser. No. 252,040 which is a rolling treatment of considerably longer duration.

Even with the pre-mix technique of the invention, an immediate short rolling period after discharge from the pelletizer is considered desirable, but not critical, for general improvement. It is contemplated that in some instances, a longer rolling period, such as several minutes, may be preferred. With the acid-powder mixing initially taking place directly on the surface of the pelletizer, longer periods of post-rolling treatment, such as at least several minutes, may be preferred.

Obviously many modifications and variations of the invention as hereinbefore set forth may be made without departing from the spirit and scope thereof, and therefore only such limitations should be imposed as are indicated in the appended claims.

What is claimed is:

1. The method of preparing discrete, coherent, spheroidal aggregates of aluminum trihydroxide having an average diameter in the range of about 0.5–5.0 mm. comprising the steps of:
    (a) admixing powdered aluminum trihydroxide and an aqueous mineral acid having a concentration of from 15–60% acid for a period of about 25 minutes, said acid having been totally added to said trihydroxide during the initial half of said time period, the amount of acid added being stoichiometrically sufficient to react with only about 4–5% of said aluminum trihydroxide,
    (b) aging the mass formed in step (a) for a period of at least two hours, under conditions which minimize changes in its moisture content, to permit completion of the reaction between said trihydroxide and said acid,
    (c) deaggregating said crumbly mass into discrete coherent particles, having a size range substantially smaller than the size range of the desired end product, and
    (d) rolling said discrete particles into large coherent spheroidal aggregates, having sufficient structural strength to withstand further handling and processing, said rolling being accomplished without the application of large particle-to-particle contact pressures.

2. The method of claim 1 wherein, further, the exothermic heat of the reaction between said acid and said trihydroxide is removed prior to deaggregating step (c).

3. The method of claim 2 wherein said heat is removed by prolonged aging and the mass formed in step (b) is cooled to ambient temperature.

4. An alumina particle suitable as a contact mass and catalyst support for promoting chemical reactions, said particle being characterized in having:
(a) an average diameter in the range of about 0.5–5.0 mm.,
(b) a packed bulk density in the range of about 0.65–0.73 kg./l. after calcination in bone dry air at about 900° F.,
(c) a total pore volume in the order of about 0.50–0.70 cc./gm.,
(d) about 25–65% of the total pore volume in pores of about 100–0.035 microns diameter,
(e) the remaining portion of the total pore volume in pores of about 0.035 micron and smaller in diameter, and
(f) a plate-to-plate hardness in the range of about 4.5–5.5 lbs.

5. An alumina particle as defined in claim 4, in which said total pore volume is in excess of 0.5 cc./g., with the major part of said pore volume being made up of micropores having an average diameter in excess of 350 A. and with the average pore size lying predominantly in the 5–10 micron range.

References Cited
UNITED STATES PATENTS

| | | | |
|---|---|---|---|
| 2,809,170 | 10/1957 | Cornelius et al. | 23—143 X |
| 2,950,169 | 8/1960 | Murray et al. | 23—143 |
| 3,038,865 | 6/1962 | Abrahams | 23—143 X |
| 3,058,907 | 10/1962 | Van Nordstrand et al. | 23—143 X |
| 3,067,128 | 12/1962 | Kimberlin et al. | 23—143 X |
| 3,185,651 | 5/1965 | Bose et al. | 23—141 X |
| 3,193,348 | 7/1965 | Mooi | 23—143 |
| 3,202,480 | 8/1965 | Nixon | 23—143 |

OSCAR R. VERTIZ, *Primary Examiner.*

MILTON WEISSMAN, *Examiner.*

H. T. CARTER, *Assistant Examiner.*